(12) United States Patent
Graf et al.

(10) Patent No.: US 7,406,450 B2
(45) Date of Patent: Jul. 29, 2008

(54) SPREAD KERNEL SUPPORT VECTOR MACHINE

(75) Inventors: Hans Peter Graf, Lincroft, NJ (US); Igor Durdanovic, East Windsor, NJ (US); Eric Cosatto, Red Bank, NJ (US); Vladimir Vapnik, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 155 days.

(21) Appl. No.: 11/276,235

(22) Filed: Feb. 20, 2006

(65) Prior Publication Data

US 2007/0094170 A1 Apr. 26, 2007

Related U.S. Application Data

(60) Provisional application No. 60/721,193, filed on Sep. 28, 2005.

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl. ...................................... 706/15
(58) Field of Classification Search ........................ None
See application file for complete search history.

(56) References Cited

U.S. PATENT DOCUMENTS 5,640,492 A 6/1997 Cortes et al.

(Continued)

OTHER PUBLICATIONS

F-SVR: A new learning algorithm for support vector regression Tohme, Mireille; Lengelle, Regis; Acoustics, Speech and Signal Processing, 2008. ICASSP 2008. IEEE International Conference on Mar. 31, 2008-Apr. 4, 2008 pp. 2005-2008 Digital Object Identifier 10.1109/ICASSP.2008.4518032.*

(Continued)

*Primary Examiner*—Michael B Holmes
(74) *Attorney, Agent, or Firm*—Joseph J. Kolodka; Paul Schwarz

(57) ABSTRACT

Disclosed is a parallel support vector machine technique for solving problems with a large set of training data where the kernel computation, as well as the kernel cache and the training data, are spread over a number of distributed machines or processors. A plurality of processing nodes are used to train a support vector machine based on a set of training data. Each of the processing nodes selects a local working set of training data based on data local to the processing node, for example a local subset of gradients. Each node transmits selected data related to the working set (e.g., gradients having a maximum value) and receives an identification of a global working set of training data. The processing node optimizes the global working set of training data and updates a portion of the gradients of the global working set of training data. The updating of a portion of the gradients may include generating a portion of a kernel matrix. These steps are repeated until a convergence condition is met. Each of the local processing nodes may store all, or only a portion of, the training data. While the steps of optimizing the global working set of training data, and updating a portion of the gradients of the global working set, are performed in each of the local processing nodes, the function of generating a global working set of training data is performed in a centralized fashion based on the selected data (e.g., gradients of the local working set) received from the individual processing nodes.

18 Claims, 14 Drawing Sheets

U.S. PATENT DOCUMENTS

| | | | |
|---|---|---|---|
| 5,649,068 A | 7/1997 | Boser | |
| 5,950,146 A | 9/1999 | Vapnik | |
| 6,128,608 A * | 10/2000 | Barnhill | 706/16 |
| 6,134,344 A | 10/2000 | Burges | |
| 6,157,921 A * | 12/2000 | Barnhill | 706/16 |
| 6,192,360 B1 * | 2/2001 | Dumais et al. | 707/6 |
| 6,269,323 B1 | 7/2001 | Vapnik | |
| 6,327,581 B1 * | 12/2001 | Platt | 706/12 |
| 6,427,141 B1 * | 7/2002 | Barnhill | 706/16 |
| 6,456,991 B1 * | 9/2002 | Srinivasa et al. | 706/20 |
| 6,633,857 B1 * | 10/2003 | Tipping | 706/16 |
| 6,658,395 B1 * | 12/2003 | Barnhill | 706/16 |
| 6,714,925 B1 * | 3/2004 | Barnhill et al. | 706/48 |
| 6,728,690 B1 * | 4/2004 | Meek et al. | 706/25 |
| 6,757,584 B2 * | 6/2004 | Thess et al. | 700/223 |
| 6,760,715 B1 * | 7/2004 | Barnhill et al. | 706/16 |
| 6,789,069 B1 * | 9/2004 | Barnhill et al. | 706/12 |
| 6,882,990 B1 * | 4/2005 | Barnhill et al. | 706/16 |
| 6,944,602 B2 * | 9/2005 | Cristianini | 706/12 |
| 6,944,616 B2 * | 9/2005 | Ferguson et al. | 707/10 |
| 6,996,549 B2 * | 2/2006 | Zhang et al. | 706/16 |
| 7,035,467 B2 * | 4/2006 | Nicponski | 382/224 |
| 7,054,847 B2 * | 5/2006 | Hartman et al. | 706/12 |
| 7,117,188 B2 * | 10/2006 | Guyon et al. | 706/20 |
| 7,299,213 B2 * | 11/2007 | Cristianini | 706/12 |
| 7,318,051 B2 * | 1/2008 | Weston et al. | 706/12 |
| 7,353,215 B2 * | 4/2008 | Bartlett et al. | 706/46 |
| 7,363,111 B2 * | 4/2008 | Vian et al. | 700/279 |

OTHER PUBLICATIONS

A Pyramidal Neural Network For Visual Pattern Recognition Phung, S.L.; Bouzerdoum, A.; Neural Networks, IEEE Transactions on vol. 18, Issue 2, Mar. 2007 pp. 329-343 Digital Object Identifier 10.1109/TNN.2006.884677.*

Combining Gradient and Evolutionary Approaches to the Artificial Neural Networks Training According to Principles of Support Vector Machines Bundzel, M.; Sincak, P.; Neural Networks, 2006. IJCNN '06. International Joint Conference on Jul. 16-21, 2006 pp. 2068-2074.*

Comparison of SVM and ANN performance for handwritten character classification Kahraman, F.; Capar, A.; Ayvaci, A.; Demirel, H.; Gokmen, M.; Signal Processing and Communications Applications Conference, 2004. Proceedings of the IEEE 12th Apr. 28-30, 2004 pp. 615-618 Digital Object Identifier 10.1109/SIU.2004.1338604.*

A Heuristic for Free Parameter Optimization with Support Vector Machines Boardman, M.; Trappenberg, T.; Neural Networks, 2006. IJCNN '06. International Joint Conference on 0-0 0 pp. 610-617 Digital Object Identifier 10.1109/IJCNN.2006.246739.*

Modeling and Recognition of Gesture Signals in 2D Space: A Comparison of NN and SVM Approaches Dadgostar, F.; Farhad Dadgostar; Sarrafzadeh, A.; De Silva, L.; Messom, C.; Tools with Artificial Intelligence, 2006. ICTAI '06. 8th IEEE International Conference on Nov. 2006 pp. 701-704 Digital Object Identifier 10.1109/ICTAI.2006.85.*

A spatiotemporal approach to tornado prediction Lakshmanan, V.; Adrianto, I.; Smith, T.; Stumpf, G.; Neural Networks, 2005. IJCNN '05. Proceedings. 2005 IEEE International Joint Conference on vol. 3, Jul. 31-Aug. 4, 2005 pp. 1642-1647 vol. 3 Digital Object Identifier 10.1109/IJCNN.2005.1556125.*

Sparse training procedure for kernel neuron Jianhua Xu; Xuegong Zhang; Yanda Li; Neural Networks and Signal Processing, 2003. Proceedings of the 2003 International Conference on vol. 1, Dec. 14-17, 2003 pp. 49-53 vol. 1 Digital Object Identifier 10.1109/ICNNSP.2003.1279210.*

Boser, B. et al., "A training algorithm for optimal margin classifiers" Proc. 5th Annual Workshop on Computational Learning Theory, Pittsburgh, ACM 1992.

Burges, C., "A tutorial on support vector machines for pattern recognition,"Data Mining and Knowledge Discovery 2, 121-167, 1998.

Chang, C-H et al., "LIBSVM: a library for support vector machines," downloaded from http://www.csie.ntu.edu.tw/~cjlin/papers/libsvm.pdf on Oct. 14, 2004.

Decoste, D. et al., "Traning invariant support vector machines," Machine Learning, 46, 161-190, Khuwer Academic Publishers, 2002.

Zanghirati, G. et al., "A parallel solver for large quadratic programs in training support vector machines", Parallel Computing 29 (2003) 535-551.

Dong, J. et al., "A fast Parallel Opt. for Trng. Support Vector Machine" Proc. of 3rd Conf. on Mach. Lrng. & Data Mining, LNAI 2734, pp. 96-105, Leipzig, Germany Jul. 5-7, 2003.

Collobert, R. et al., "Torch: A modular machine learning software library", Technical Report IDIAP-RR 02-46, IDIAP, 2002.

Joachims, T., "Making large-scale support vector machine learning practical", Advances in Kernel Methods, B. Scholkopf, et al. (eds.), Cambridge, MIT Press, 1998.

Osuna, E. et al., "Support vector machines: Training and Application", MIT AI Memorandum 1602, Mar. 1997.

Platt, J.C., "Fast training of support vector machines using sequential minimal optimization", in Adv. in Kernel Methods, Scholkopf, et al. (eds) 1998.

Tveit, T. et al., "Parallelization of the Incremental Proximal Support Vector Machine Classifier using a Heap-based Tree Topology", Tech. Report, IDI, NTNU, Trondheim, 2003.

D'Apuzzo, M., et al., "Parallel Comp. Issues of an Interior Point Method for Solving Large Bound-Constrained Quadratic Program. Problems", Parallel Comput., 29, 467-483, 2003.

Graf, H.P., et al., "Parallel Support Vector Machines: The Cascade SVM", NIPS, vol. 17, MIT Press, 2005.

Collobert, R. et al., "Scaling Large Learning Problems with Hard Parallel Mixtures," International Journal of Pattern Recognition and Artificial Intel. 2003.

Collobert, Ronan, et al., "A Parallel Mixture of SVMs for Very Large Scale Problems", Neural Information Processing Systems, vol. 17, Dec. 31, 2004.

Smelyanskiy, Mikhail, et al., "Parallel Computing for Large-Scale Optimization Problems: Challenges and Solutions", Intel Technical Journal, Compute-Intensive, Highly Parallel Applications and Uses, vol. 9, No. 2, May 19, 2005.

* cited by examiner

```
                            550
lo = 1; hi = n  Range of indices handled on one machine
α_i := 0, i = 1 .. n       Initialize α's
G_i := -1, i = lo .. hi    Initialize gradients
do
        WS(i ,j) := find working set(lo, hi)
        (Δα_i, Δα_j) := compute Δα-s (Optimize W)
        α_i += Δα_i
        α_j += Δα_j
        G_k += y_i y_k Δα_i K(x_i, x_k), k = lo .. hi
        G_k += y_j y_k Δα_j K(x_j, x_k), k = lo .. hi
while !converged
```

FIG. 9B $$950 \begin{cases} \text{lo} = 1 + m * (n/p); \quad \text{Range of indices handled on machine m} \\ \text{hi} = \min(n, \text{lo} + (n/p)) \end{cases}$$

$\alpha_i := 0, i = 1 .. n$     Initialize $\alpha$'s
$G_i := -1, i = \text{lo} .. \text{hi}$     Initialize gradients
do WS(i, j) := find working set(lo, hi)
    Communicate two largest gradients from each machine to find globally optimal working set.
    Communicate to each machine indices i, j of working set (globally optimal set).
    $(\Delta\alpha_i, \Delta\alpha_j) :=$ compute $\Delta\alpha$-s (Optimize W)
    $\alpha_i \mathrel{+}= \Delta\alpha_i$
    $\alpha_j \mathrel{+}= \Delta\alpha_j$
    $G_k \mathrel{+}= y_i y_k \Delta\alpha_i K(x_i, x_k), k = \text{lo} .. \text{hi}$
    $G_k \mathrel{+}= y_j y_k \Delta\alpha_j K(x_j, x_k), k = \text{lo} .. \text{hi}$ while !converged

*FIG. 11B*

1150 $\begin{cases} \text{lo} = 1 + m * (n/p); & \text{Range of indices handled on machine m} \\ \text{hi} = \min(n,\ \text{lo} + (n/p)) \end{cases}$ $\alpha_i := 0,\ i = 1\ ..\ n\quad$ Initialize $\alpha$'s
$G_i := -1,\ i = \text{lo}\ ..\ \text{hi}\quad$ Initialize gradients
do
    WS(i, j) := find working set(lo, hi)
    Communicate two largest gradients from each machine to find globally optimal working set.
    Communicate to each machine indices i, j of working set (globally optimal set).
    Send vectors $x_i$, $x_j$ to each machine
    $(\Delta\alpha_i, \Delta\alpha_j)$ := compute $\Delta\alpha$-s (Optimize W, using smo)
    $\alpha_i$ += $\Delta\alpha_i$
    $\alpha_j$ += $\Delta\alpha_j$
    $G_k$ += $y_i y_k \Delta\alpha_i K(x_i, x_k),\ k = \text{lo}\ ..\ \text{hi}$
    $G_k$ += $y_j y_k \Delta\alpha_j K(x_j, x_k),\ k = \text{lo}\ ..\ \text{hi}$ 1152 $\begin{cases} \text{Remove vectors } x_i,\ x_j\ \text{(from machines where these data} \\ \text{are not assigned)} \end{cases}$ while !converged

SPREAD KERNEL SUPPORT VECTOR MACHINE

This application claims the benefit of U.S. Provisional Application No. 60/721,193 filed Sep. 28, 2005, which is incorporated herein by reference.

BACKGROUND OF THE INVENTION

The present invention relates generally to machine learning, and more particularly to support vector machines.

Machine learning involves techniques to allow computers to "learn". More specifically, machine learning involves training a computer system to perform some task, rather than directly programming the system to perform the task. The system observes some data and automatically determines some structure of the data for use at a later time when processing unknown data.

Machine learning techniques generally create a function from training data. The training data consists of pairs of input objects (typically vectors), and desired outputs. The output of the function can be a continuous value (called regression), or can predict a class label of the input object (called classification). The task of the learning machine is to predict the value of the function for any valid input object after having seen only a small number of training examples (i.e. pairs of input and target output).

One particular type of learning machine is a support vector machine (SVM). SVMs are well known in the art, for example as described in V. Vapnik, *Statistical Learning Theory*, Wiley, New York, 1998; and C. Burges, A Tutorial on Support Vector Machines for Pattern Recognition, Data Mining and Knowledge Discovery 2, 121-167, 1998. Although well known, a brief description of SVMs will be given here in order to aid in the following description of the present invention.

Consider the classification shown in FIG. 1 which shows data having the classification of circle or square. The question becomes, what is the best way of dividing the two classes? An SVM creates a maximum-margin hyperplane defined by support vectors as shown in FIG. 2. The support vectors are shown as 202, 204 and 206 and they define those input vectors of the training data which are used as classification boundaries to define the hyperplane 208. The goal in defining a hyperplane in a classification problem is to maximize the margin (w) 210 which is the distance between the support vectors of each different class. In other words, the maximum-margin hyperplane splits the training examples such that the distance from the closest support vectors is maximized. The support vectors are determined by solving a quadratic programming (QP) optimization problem. There exist several well known QP algorithms for use with SVMs, for example as described in R. Fletcher, *Practical Methods of Optimization*, Wiley, New York, 2001; and M. S. Bazaraa, H. D. Shrali and C. M. Shetty, *Nonlinear Programming: Theory and Algorithms*, Wiley Interscience, New York, 1993. Only a small subset of the training data vectors (i.e., the support vectors) need to be considered in order to determine the optimal hyperplane. Thus, the problem of defining the support vectors may also be considered a filtering problem. More particularly, the job of the SVM during the training phase is to filter out the training data vectors which are not support vectors.

As can be seen from FIG. 2, the optimal hyperplane 208 is linear, which assumes that the data to be classified is linearly separable. However, this is not always the case. For example, consider FIG. 3 in which the data is classified into two sets (X and O). As shown on the left side of the figure, in one dimensional space the two classes are not linearly separable. However, by mapping the one dimensional data into 2 dimensional space as shown on the right side of the figure, the data becomes linearly separable by line 302. This same idea is shown in FIG. 4, which, on the left side of the figure, shows two dimensional data with the classification boundaries defined by support vectors (shown as disks with outlines around them). However, the class divider 402 is a curve, not a line, and the two dimensional data are not linearly separable. However, by mapping the two dimensional data into higher dimensional space as shown on the right side of FIG. 4, the data becomes linearly separable by hyperplane 404. The mapping function that calculates dot products between vectors in the space of higher dimensionality is called a kernel and is generally referred to herein as k. The use of the kernel function to map data from a lower to a higher dimensionality is well known in the art, for example as described in V. Vapnik, *Statistical Learning Theory*, Wiley, New York, 1998.

After the SVM is trained as described above, input data may be classified by applying the following equation:

$$y = \text{sign}\left(\sum_{i=1}^{M} \alpha_i k(x_i, x) - b\right)$$

where $x_i$ represents the support vectors, x is the vector to be classified, $\alpha_i$ and b are parameters obtained by the training algorithm, and y is the class label that is assigned to the vector being classified.

The equation $k(x,x_i) = \exp(-\|x-x_i\|^2/c)$ is an example of a kernel function, namely a radial basis function. Other types of kernel functions may be used as well.

Although SVMs are powerful classification and regression tools, one disadvantage is that their computation and storage requirements increase rapidly with the number of training vectors, putting many problems of practical interest out of their reach. As described above, the core of an SVM is a quadratic programming problem, separating support vectors from the rest of the training data. General-purpose QP solvers tend to scale with the cube of the number of training vectors ($O(k^3)$). Specialized algorithms, typically based on gradient descent methods, achieve gains in efficiency, but still become impractically slow for problem sizes on the order of 100,000 training vectors (2-class problems).

One existing approach for accelerating the QP is based on 'chunking' where subsets of the training data are optimized iteratively, until the global optimum is reached. This technique is described in B. Boser, I. Guyon. V. Vapnik, "A training algorithm for optimal margin classifiers" in Proc. 5th Annual Workshop on Computational Learning Theory, Pittsburgh, ACM, 1992; E. Osuna, R. Freund, F. Girosi, "Training Support Vector Machines, an Application to Face Detection", in Computer vision and Pattern Recognition, pp. 130-136, 1997; and T. Joachims, "Making large-scale support vector machine learning practical", in Advances in Kernel Methods, B. Schölkopf, C. Burges, A. Smola, (eds.), Cambridge, MIT Press, 1998. 'Sequential Minimal Optimization' (SMO), as described in J. C. Platt, "Fast training of support vector machines using sequential minimal optimization", in Adv. in Kernel Methods: Schölkopf, C. Burges, A. Simola (eds.), 1998 reduces the chunk size to 2 vectors, and is the most popular of these chunking algorithms. Eliminating non-support vectors early during the optimization process is another strategy that provides substantial savings in computation. Efficient SVM implementations incorporate steps known as 'shrinking' for early identification of non-support vectors, as described in T. Joachims, "Making large-scale support vector machine learning practical", in Advances in Kernel Methods, B. Schölkopf, C. Burges, A. Smola, (eds.), Cambridge, MIT Press, 1998; and R. Collobert, S. Bengio, and J. Mariéthoz, "Torch: A modular machine learning software library", Technical Report IDIAP-RR 02-46, IDIAP, 2002. In combination with caching of the kernel data, these techniques reduce the computation requirements by orders of magnitude. Another approach, named 'digesting', and described in D. DeCoste and B. Schölkopf, "Training Invariant Support Vector Machines", Machine Learning 46, 161-190, 2002 optimizes subsets closer to completion before adding new data, thereby saving considerable amounts of storage.

Improving SVM compute-speed through parallelization is difficult due to dependencies between the computation steps. Parallelizations have been attempted by splitting the problem into smaller subsets that can be optimized independently, either through initial clustering of the data or through a trained combination of the results from individually optimized subsets as described in R. Collobert, Y. Bengio, S. Bengio, "A Parallel Mixture of SVMs for Very Large Scale Problems", in Neural Information Processing Systems, Vol. 17, MIT Press, 2004. If a problem can be structured in this way, data-parallelization can be efficient. However, for many problems, it is questionable whether, after splitting into smaller problems, a global optimum can be found. Variations of the standard SVM algorithm, such as the Proximal SVM as described in A. Tveit, H. Engum, "Parallelization of the Incremental Proximal Support Vector Machine Classifier using a Heap-based Tree Topology", Tech. Report, IDI, NTNU, Trondheim, 2003 are better suited for parallelization, but their performance and applicability to high-dimensional problems remain questionable. Another parallelization scheme as described in J. X. Dong, A. Krzyzak, C. Y. Suen, "A fast Parallel Optimization for Training Support Vector Machine." Proceedings of $3^{rd}$ International Conference on Machine Learning and Data Mining, P. Perner and A. Rosenfeld (Eds.), Springer Lecture Notes in Artificial Intelligence (LNAI 2734), pp. 96-105, Leipzig, Germany, Jul. 5-7, 2003, approximates the kernel matrix by a block-diagonal.

Other parallelization techniques also exist. G. Zanghirati, L. Zanni, "A Parallel Solver for Large Quadratic Programs in Training Support Vector Machines", Parallel Computing, 29, 535-551, 2003, describes a parallel optimization algorithm based on gradient projections that uses a spectral gradient method for fast convergence. U.S. patent application Ser. No. 10/978,129, filed Oct. 29, 2004, entitled Parallel Support Vector Method and Apparatus, describes a parallelization technique that breaks a training data set into smaller subsets that are optimized individually in a distributed manner. Interior point (IP) methods are known for solving large quadratic programming (QP) problems, and parallelizations have been proposed, for example in M. D'Appuzo, M. Marino, "Parallel Computational Issues of an Interior Point Method for Solving Large Bound-Constrained Quadratic Programming Problems", Parallel Computing, 29, 467-483, 2003.

Although SVMs, and the above described techniques, are powerful regression and classification tools, they do not scale well to very large problems.

BRIEF SUMMARY OF THE INVENTION

The present invention provides a parallel SVM technique for efficiently solving problems with a large set of training data. In accordance with one aspect of the invention, the kernel computation, as well as the kernel cache and the training data, are spread over a number of distributed machines or processors.

In one embodiment, a plurality of processing nodes are used to train a support vector machine based on a set of training data. Each of the processing nodes selects a local working set of training data based on data local to the processing node. In one embodiment, the data may be a local subset of gradients. The node transmits selected data related to the working set and receives an identification of a global working set of training data. In one embodiment, the selected data may be gradients of the local working set having a maximum value. The processing node optimizes the global working set of training data and updates a portion of the gradients of the global working set of training data. The updating of a portion of the gradients may include generating a portion of a kernel matrix. These steps are repeated until a convergence condition is met.

In various embodiments, each of the local processing nodes may store all, or only a portion of, the training data. Where the local processing nodes store only a portion of the training data, the local processing nodes also receive at least a portion of the global working set of training data in order to perform the optimization step.

While the steps of optimizing the global working set of training data and updating a portion of the gradients of the global working set are performed in each of the local processing nodes, the function of generating a global working set of training data is performed in a centralized fashion based on the selected data (e.g., gradients of the local working set) received from the individual processing nodes. In one embodiment, gradients having a maximum value are determined using a tree structure of network nodes, and the determined gradients are transmitted to the local processing nodes using a hierarchal broadcast technique.

These and other advantages of the invention will be apparent to those of ordinary skill in the art by reference to the following detailed description and the accompanying drawings.

BRIEF DESCRIPTION OF THE DRAWINGS

FIG. 9B is pseudo code of the algorithm shown in FIG. 9A;

FIG. 11B is pseudo code of the algorithm shown in FIG. 11A;

DETAILED DESCRIPTION

The principles of the present invention will be discussed herein in the context of the standard support vector machine (SVM) algorithm solved in dual formulation with an emphasis on two-class classification problems. One skilled in the art will recognize that the principles of the present invention may be applied to alternative problems, such as regression or multi-class classification, in a similar manner.

Consider a set of/training examples $(x_i; y_i)$, where $x_i \in R^d$ represents a d-dimensional pattern and $y_i = \pm 1$ is the class label. $K(x_i, x_j)$ is the matrix of kernel values between patterns and $\alpha_i$ the Lagrange coefficients to be determined by the optimization. Solving the SVM problem includes minimizing the following quadratic function:

$$\min_\alpha (W) = \min\left(\frac{1}{2} * \sum_i^l \sum_j^l \alpha_i \alpha_j y_i y_j K(x_i, x_j) - \sum_i^l \alpha_i\right) \quad (1)$$

$$\text{Subject to:} \quad 0 \le a_i \le C, \forall i \text{ and } \sum_i^l a_i y_i = 0 \quad (2)$$

The algorithms discussed here are based on gradient descent, and gradients are also used to maintain the information of the state of the global optimization and to select the working set (see below). The gradient of W with respect to $\alpha$ is:

$$G_i = \frac{\partial W}{\partial \alpha_i} = y_i \sum_{j=1}^l y_j \alpha_j K(x_i, x_j) - 1 \quad (3)$$

Figure 1:
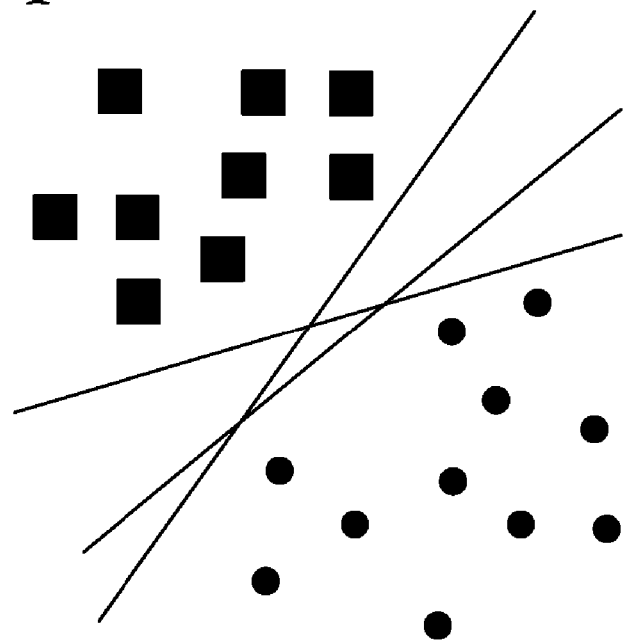
FIG. 1 shows a 2-class data set.
Figure 2:
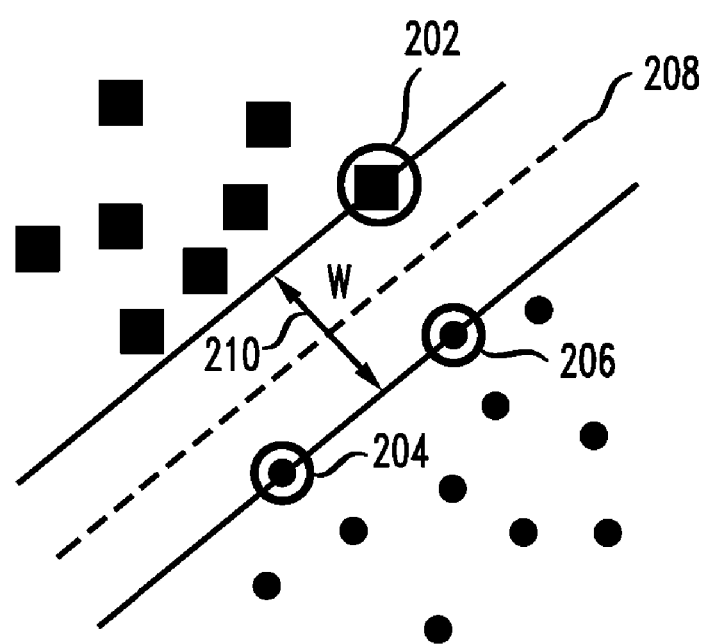
FIG. 2 shows a 2-class data set classified using a maximum-margin hyperplane defined by support vectors.
Figure 3:
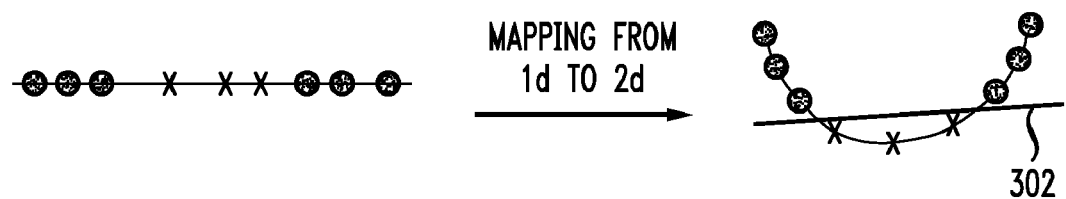
FIGS. 3 and 4 illustrate mapping lower dimensional data into higher dimensional space so that the data becomes linearly separable.
Figure 4:
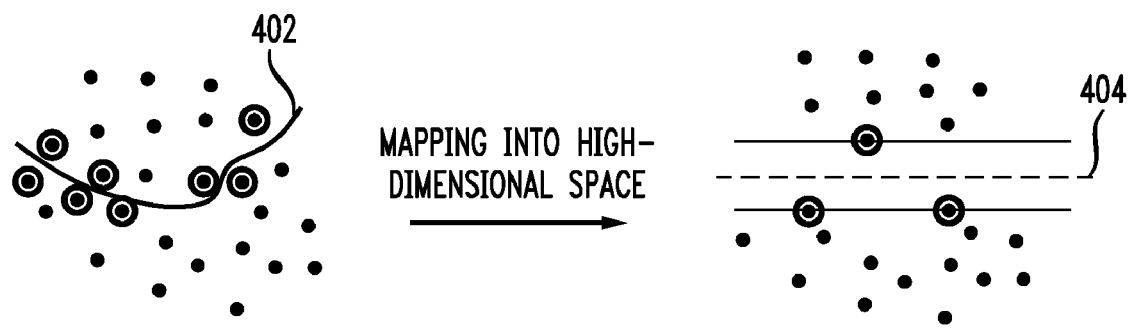
Figures 5A, 5B:
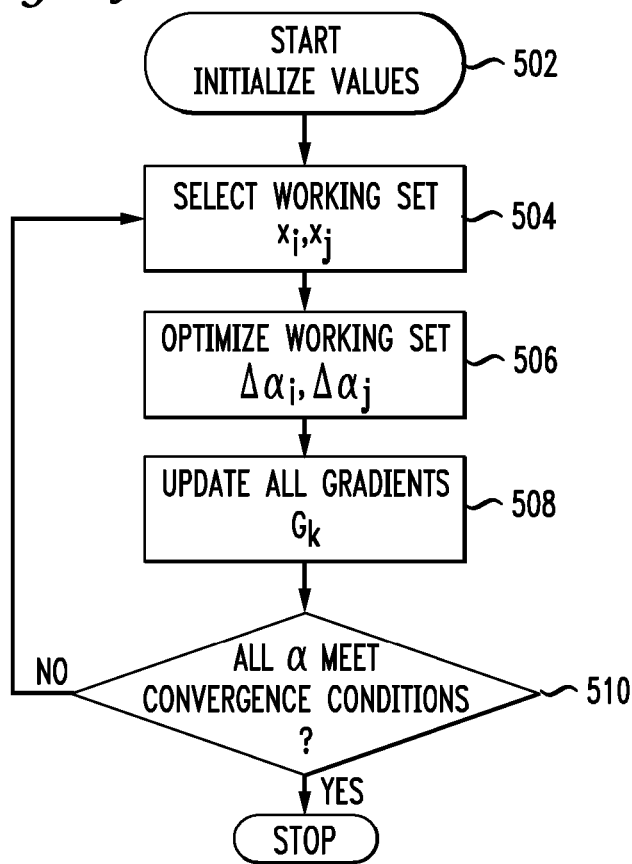
FIG. 5A shows a flowchart of the basic SVM optimization algorithm with segmentation of the training data into working sets.
FIG. 5B is pseudo code of the algorithm shown in FIG. 5A.
Figure 6:
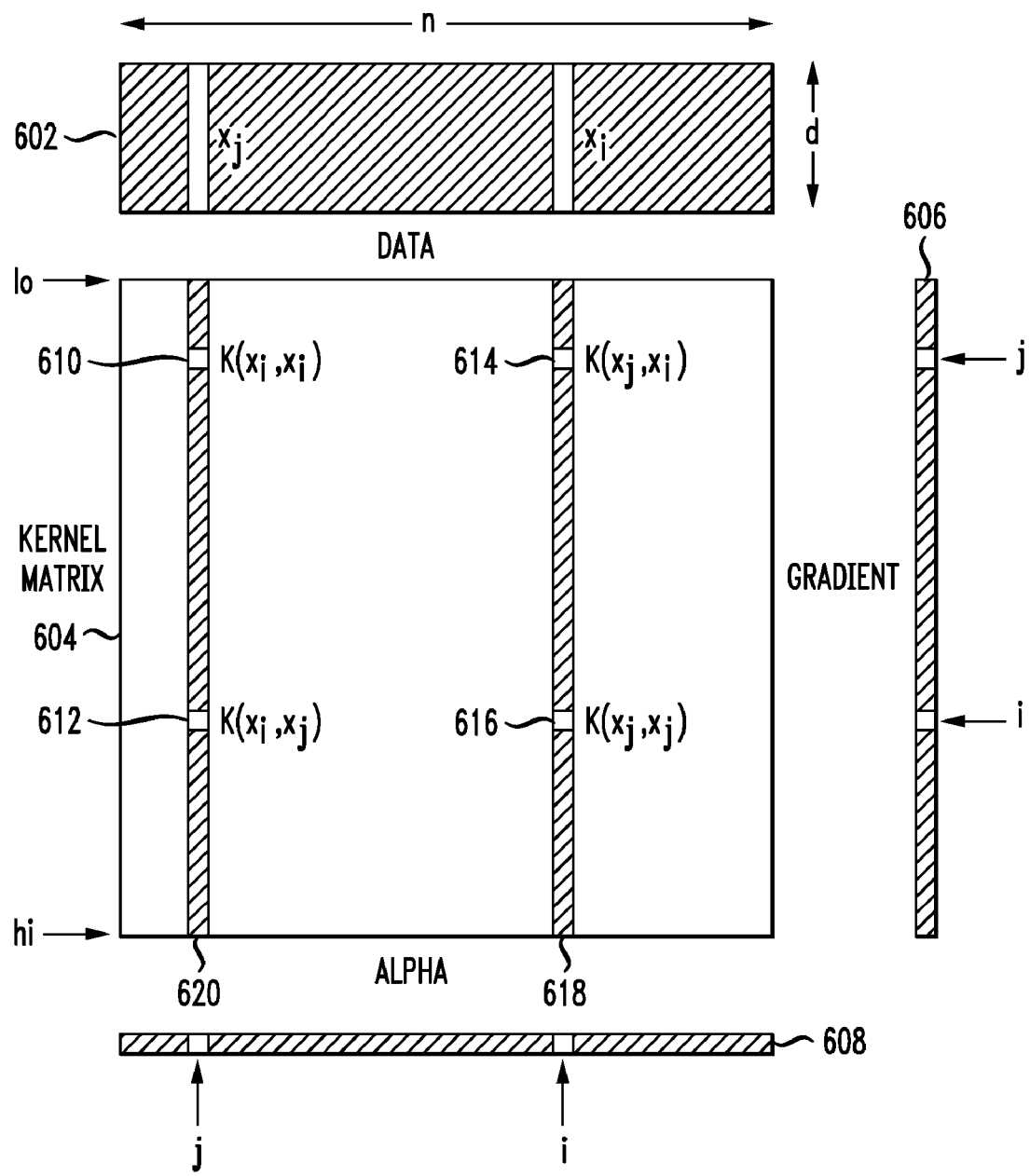
FIG. 6 is a schematic diagram illustrating the data items of the algorithm shown in FIGS. 5A and 5B.

SVM implementations do not solve the Quadratic Programming (QP) problem of equation (1) in one large optimization, since such optimizations tend to scale poorly (approximately with $n^3$). Rather, the training set is divided into smaller working sets, with $n_w$ elements, where $n_w$ usually is very small (often $n_w = 2$). The optimization is executed on a working set $n_w$ and after each optimization a new working set is selected from the training data. This algorithm will be described further below in conjunction with FIGS. 5A, 5B and 6. FIG. 5A shows a flowchart of the basic SVM optimization algorithm with segmentation of the training data into working sets. FIG. 5B is pseudo code of the same algorithm. FIG. 6 is a schematic diagram illustrating the data items of the algorithm shown in FIGS. 5A and 5B. FIG. 6 shows the training data set 602 having n vectors of dimension d, the kernel matrix 604, the gradients 606, and the $\alpha$'s 608. It is noted that the algorithm shows the case where the working set $n_w$ has the size 2, which corresponds to the well known sequential minimization optimization algorithm described in Platt, J. C., "Fast Training of Support Vector Machines Using Sequential Minimal Optimization", in Advances in Kernel Methods, B. Schölkopf, C. Burges, A. Smola, (eds.), MIT Press, Cambridge, 1998. However, other working set sizes may be used as well. If the working set size is 2, then the optimization can be solved analytically, which is convenient, but larger sizes of working sets can be optimized using standard numerical optimization algorithms.

The algorithm is described as follows. It is noted that the algorithm will be described with particular reference to the steps of the flowchart of FIG. 5A. One skilled in the art will readily be able to associate portions of the pseudo code of FIG. 5B with the steps of the FIG. 5A flowchart. First, values are initialized in step 502. We start from a feasible point by initializing alphas to 0 ($\alpha_i = 0$) and the gradients to $-1$ ($G_i = -1$). In addition, the initialization step also sets the range (lo to hi) of indices handled on the particular machine. In this case, since there is only one machine, lo is set to 1 and hi is set to n as shown at 550 in the pseudo code of FIG. 5B. In step 504 a working set $(x_i, x_j)$ is selected based on the gradients calculated in step 508 (for the first iteration, two training data samples are chosen randomly for the working set). In step 506 the working set is optimized. The optimization of function W (equation 1) is performed taking into account only the $\alpha$ of the working set, while all other $\alpha$'s are kept constant. This leads to changes of the $\alpha$ values in the working set ($\Delta\alpha_1, \Delta\alpha_2$). The optimization in step 506 requires the kernel matrix elements $K(x_i, x_i)$ 610, $K(x_j, x_i)$ 614, $K(x_i, x_j)$ 612 and $K(x_j, x_j)$ 616. Then, in step 508, all the gradients ($G_k$) 606 are updated. There is one gradient for each vector in the training set. Therefore all the elements $K(x_i, x_k)$ (column 620) and $K(x_j, x_k)$ (column 618) (k=1 . . . n) of the kernel matrix have to be computed for this update. In step 510 it is determined whether the convergence conditions have been met. The convergence to the global optimum is guaranteed when all $\alpha$'s meet the Karush-Kuhn-Tucker (KKT) conditions. The KKT conditions define conditions that must be met in the optimal solution of a quadratic optimization problem. They are necessary and sufficient conditions (i.e., they can be used to test if a solution is indeed optimal, and parameters that do not yet have optimal values can be identified). In various implementations, convergence criteria may be based on measuring the values of the gradients, on changes of the $\alpha$'s during the optimizations, or on time limits. Such heuristics can provide accurate approximations of the KKT conditions for most applications. If the convergence conditions are not met, then control passes to step 504 and steps 504, 506 and 508 are repeated until the convergence criteria are met, indicating that a global optimum has been found.

Figure 7:
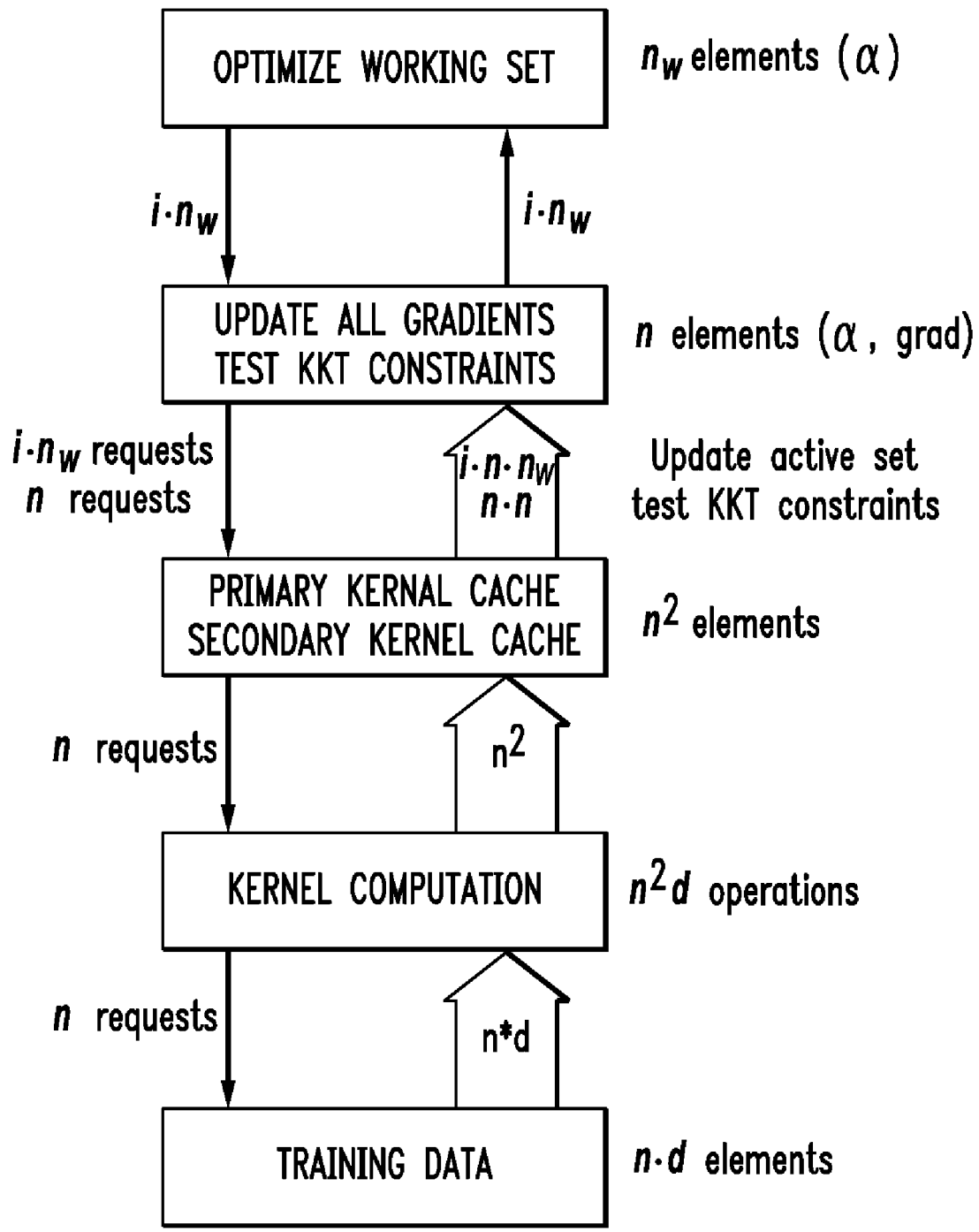
FIG. 7 shows the major computational and storage blocks of the algorithm shown in FIGS. 5A and 5B.

FIG. 7 shows the major computational and storage blocks of the algorithm shown in FIGS. 5A and 5B, with an indication (as shown by arrows) of the communication requirements between them. In FIG. 7, n is the number of training vectors; d is the dimension of the training vectors; $n_w$ is the number of vectors in the working set; and i is the number of iterations (i.e., number of times working set is selected). For example, with one million training vectors ($n = 10^6$), the full kernel matrix contains $10^{12}$ elements, and with a vector dimensionality $d = 10^4$, the kernel computation requires on the order of $10^{16}$ operations. Such numbers are clearly beyond what an average current state of the art personal computer or workstation can handle in reasonable time.

Figure 8:
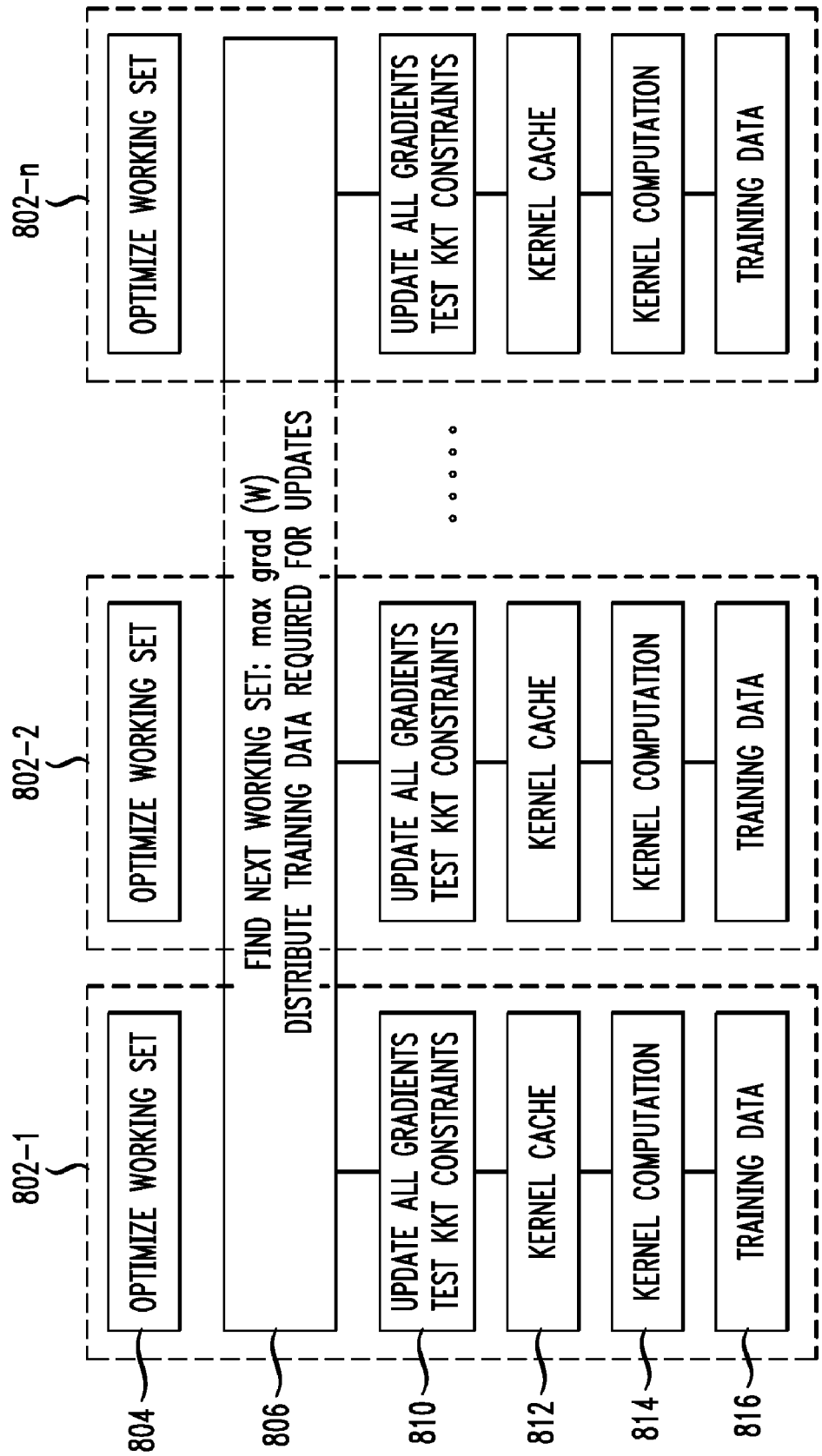
FIG. 8 illustrates the division of the functional blocks of FIG. 7 vertically into slices, where each of the slices is mapped onto a different machine.

The present invention utilizes parallelization by spreading a single optimization over multiple machines, without requiring very tight coupling between machines. It works efficiently on a message passing multi-processor with a low-cost connection network. Moreover, it maintains the effective segmentation approach described above in conjunction with FIG. 5. The parallelization gain, therefore, is added to the most efficient SVM algorithms currently in use. The present invention parallelizes the most computationally expensive of the functions shown in FIG. 7. The invention can be considered as dividing the functional blocks of FIG. 7 vertically into slices, where each of the slices is mapped onto a different machine. This vertical slicing and parallelization is illustrated in FIG. 8. As shown, the computational steps of optimizing the working set 804, updating the gradients and testing the KKT constraints 810, and computing the kernel 814, are divided and distributed among multiple machines (or processors) 802-1, 802-2, 802-n. As a result, the storage of the kernel cache 812 as well as the training data 816 (in some embodiments) may also be divided and distributed among the multiple machines (or processors) 802-1, 802-2, 802-n. The function of finding the next working set and distributing the training data (in some embodiments) (806) is not distributed, is spread over the network, and is performed by one or more centralized machines (or processors) on behalf of the network. The functional division shown in FIG. 8 has been chosen as advantageous based on experimentation during which storage and computational blocks were segmented into small units and combined in various ways.

Figure 9A:
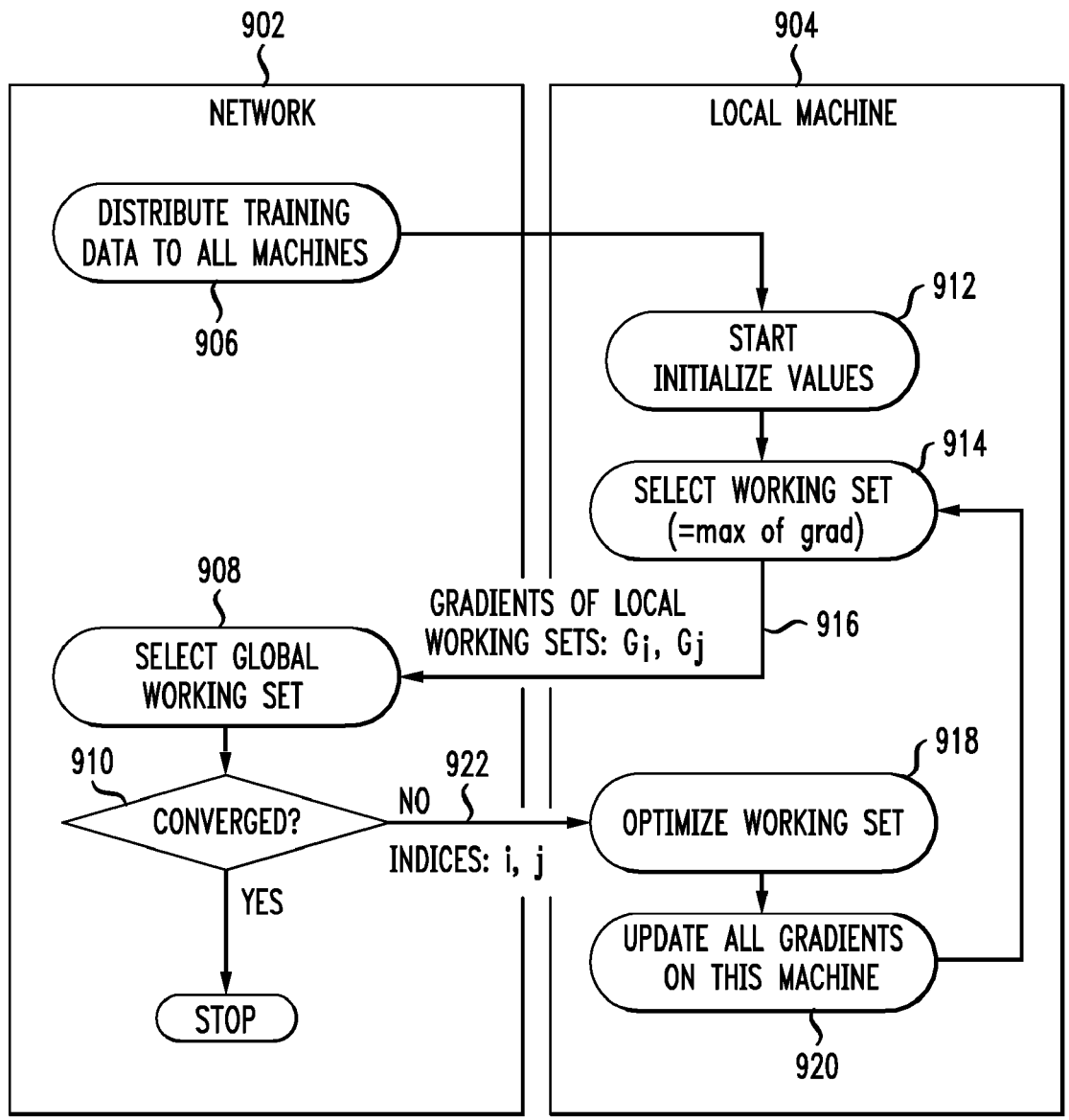
FIG. 9A shows a flowchart of an algorithm in accordance with one embodiment of the invention.
Figure 10:
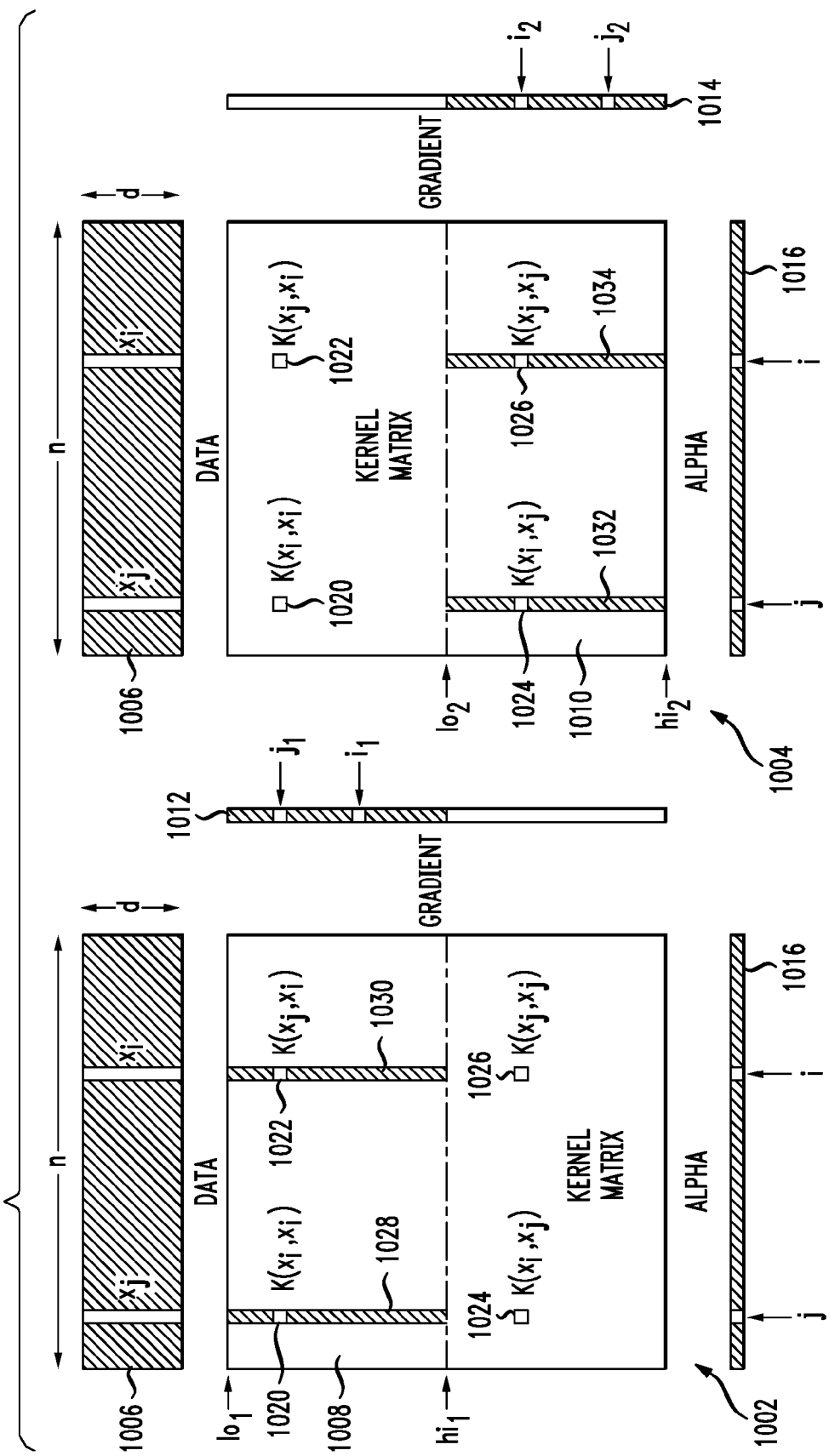
FIG. 10 is a schematic diagram illustrating the data items of the algorithm shown in FIGS. 9A and 9B.

One embodiment of the present invention will be described further below in conjunction with FIGS. 9A, 9B and 10. FIG. 9A shows a flowchart of the algorithm. FIG. 9B is pseudo code of the same algorithm. FIG. 10 is a schematic diagram illustrating the data items of the algorithm shown in FIGS. 9A and 9B as stored on two machines, 1002 and 1004. Only two machines are shown for clarity, but one skilled in the art could readily extend the discussion to an understanding of multiple machines. In this embodiment, it is assumed that the entire set of training data is stored on each of the local machines. FIG. 10 shows the training data set 1006 having n vectors of dimension d, with each of the machines 1002 and 1004 storing the entire training data set. As will be described in further detail below, each of the machines only stores a portion of the kernel matrix, with machine 1002 storing the upper half (i.e., portion 1008) of the kernel matrix and machine 1004 storing the lower half (i.e., portion 1010) of the kernel matrix. Also shown are the gradients 1012 stored on machine 1002 and gradients 1014 stored on machine 1004. Each of the machines 1002 and 1004 stores all of the α's 1016.

More generally, in this embodiment, each of the machines stores the following:

vector components $n \times d$ kernel elements $\dfrac{n \times n}{p}$

α: $n$

Gradients: $\dfrac{n}{p}$ where: n is the number of training vectors; d is the dimension of the training vectors; and p is the number of machines.

The algorithm is described as follows. It is noted that the algorithm will be described with particular reference to the steps of the flowchart of FIG. 9A. One skilled in the art will readily be able to associate portions of the pseudo code of FIG. 9B with the steps of the FIG. 9A flowchart. FIG. 9A shows the steps performed by the network 902 and the steps performed by each of the local machines 904. The network steps are the steps performed in a centralized manner on behalf of all the machines performing the SVM algorithm. Thus, such steps are not distributed, but instead are centralized for all the local machines. These network steps 902, however, may be performed by one single central machine, or may be performed by multiple machines. What is important is that the function performed is a centralized function coordinated among all the machines. Reference to steps performed at local machine 904 should be understood to mean that the steps are performed by all p local machines.

In step 906, the full training data set is distributed by the network 902 to the local machine 904. Values are initialized at the local machine 904 in step 912. This initialization is as described above in connection with step 502 of FIG. 5A. It is noted here that each of the local machines 904 only handle a particular range (lo to hi) of indices, and these values are set as shown at 950 in the pseudo code of FIG. 9B. As illustrated in FIG. 10, machine 1002 handles indices from $lo_1$ to $hi_1$, and machine 1004 handles indices from $lo_2$ to $hi_2$. In step 914 the local machine 904 selects a working set $(x_i, x_j)$ based on the gradients calculated in step 920 (for the first iteration, two training data samples are chosen randomly for the working set). It is noted here that since each machine has only a local view of the kernel matrix (as shown in FIG. 10), it cannot drive the global optimization. Thus, as represented at 916, the local machine 904 transmits is $n_w$ largest gradients $(G_i, G_j)$ over the network to network machine 902. What is described here as occurring on a single machine (902) may actually occur in a distributed fashion through the exchange of data between multiple machines on the network. In a distributed technique the machines engage in workset propagation/exchange in order to arrive (on each machine) at the global workset. Techniques for such propagation/exchange are described in further detail below in conjunction with FIGS. 13-15. The network machine 902 then uses the received gradients to select the global working set in step 908. This depends on $n_w$. In the case of a small $n_w$ (e.g., $n_w=2$) the computational cost is small compared to the network communication cost. The indices i and j of the globally optimal working set are communicated to the local machine 904 as represented by 922. It is noted that selection of the globally optimal working set is important for rapid convergence to the global optimum. Experimentation has shown that it is more effective to drive the optimization based on a global view of all the gradients at the network machine 902, than letting each local machine do optimizations based on their local data and then consolidate the results.

In step 918 the global working set is optimized as discussed above in connection with step 506 of FIG. 5. The optimization in step 918 requires the kernel matrix elements $K(x_i, x_i)$, $K(x_j, x_i)$, $K(x_i, x_j)$ and $K(x_j, x_j)$. As shown in FIG. 10, each of the local machines 1002 and 1004 contains the entire set of training data 1006, and each local machine can determine the necessary kernel matrix elements $K(x_i, x_i)$ 1020, $K(x_j, x_i)$ 1022, $K(x_i, x_j)$ 1024 and $K(x_j, x_j)$ 1026. Next, the gradients of the entire set need to be updated. Again, since the local machines 1002 and 1004 each contain the entire set of training data 1006, each local machine can update its set of gradient in step 920. It is noted that $K(x_i, x_j)$ is equivalent to $K(x_j, x_i)$, and therefore if a machine has one of these elements, it affectively has both of these elements. However, unlike the method of FIG. 5, in accordance with the principles of the present invention, each of the local machines 1002 and 1004 only stores a subset of the kernel matrix. Thus, with respect to kernel elements $K(x_i, x_k)$ and $K(x_j, x_k)$, local machine 1002 computes these elements for $(k=lo_1 \ldots hi_1)$, as shown in FIG. 10 as columns 1028 and 1030 respectively. Local machine 1004 computes these elements for $(k=lo_2 \ldots hi_2)$, as shown in FIG. 10 as columns 1032 and 1034 respectively. When the convergence test of step 910 is satisfied, the method ends.

Thus, in accordance with the advantages of the present invention, each of the local machines only needs to compute and store a portion of the kernel matrix. Local machine 1002 computes and stores portion 1008 and local machine 1004 computes and stores portion 1010. Since the computation and storage of the kernel matrix is one of the costliest functions (in terms of computing resources), the distribution of these functions among distributed local machines provides significant processing optimizations.

Figure 11A:
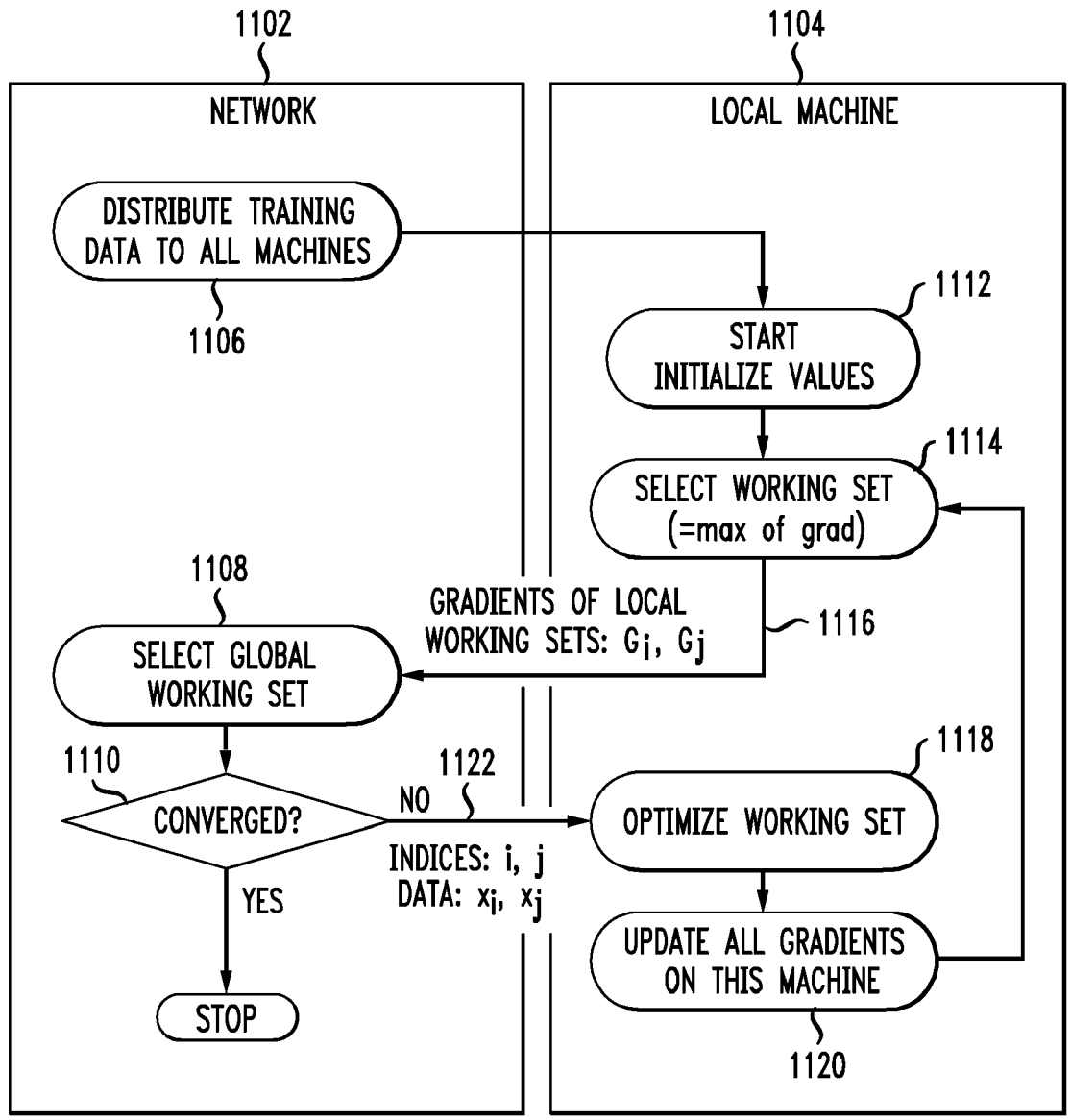
FIG. 11A shows a flowchart of an algorithm in accordance with one embodiment of the invention.
Figure 12:
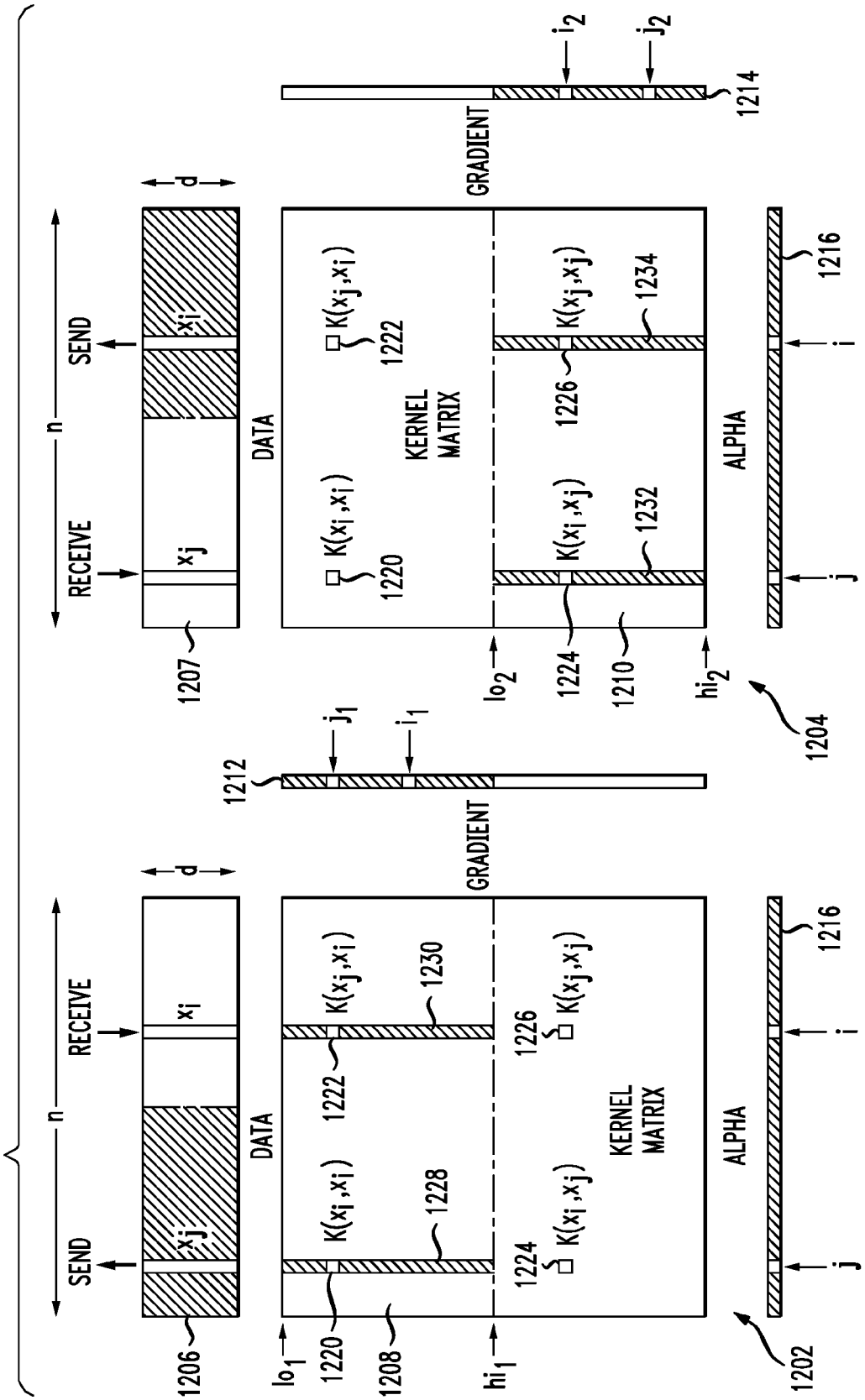
FIG. 12 is a schematic diagram illustrating the data items of the algorithm shown in FIGS. 11A and 11B.

Another embodiment of the present invention will be described further below in conjunction with FIGS. 11A, 11B and 12. FIG. 11A shows a flowchart of the algorithm. FIG. 11B is pseudo code of the same algorithm. FIG. 12 is a schematic diagram illustrating the data items of the algorithm shown in FIGS. 11A and 11B as stored on two machines, 1202 and 1204. Only two machines are shown for clarity, but one skilled in the art could readily extend the discussion to an understanding of multiple machines. In this embodiment, it is assumed that the machines do not store the entire set of training data, but instead the training data is distributed over multiple local machines. FIG. 12 shows the training data set having n vectors of dimension d. However, unlike the embodiment described above in conjunction with FIG. 10, in this embodiment each of the machines 1202 and 1204 only store a portion of the training data set. Machine 1202 stores shaded portion 1206, and machine 1204 stores shaded portion 1207. As will be discussed in further detail below, each of the machines only stores a portion of the kernel matrix, with machine 1202 storing the upper half (i.e., portion 1208) of the kernel matrix and machine 1204 storing the lower half (i.e., portion 1210) of the kernel matrix. Also shown are the gradients 1212 stored on machine 1202 and gradients 1214 stored on machine 1204. Each of the machines 1202 and 1204 stores all of the α's 1216.

More generally, in this embodiment, each of the machines stores the following:

vector components $\frac{n \times d}{p}$ kernel elements $\frac{n \times n}{p}$

α: $n$

Gradients: $\frac{n}{p}$ where: n is the number of training vectors; d is the dimension of the training vectors; and p is the number of machines.

The algorithm is described as follows. It is noted that the algorithm will be described with particular reference to the steps of the flowchart of FIG. 11A. One skilled in the art will readily be able to associate portions of the pseudo code of FIG. 11B with the steps of the FIG. 11A flowchart. FIG. 11A shows the steps performed by the network 1102 and the steps performed by each of the local machines 1104. The network steps are the steps performed in a centralized manner on behalf of all the machines performing the SVM algorithm. Thus, such steps are not distributed, but instead are centralized for all the local machines. These network steps 1102, however, may be performed by one single central machine, or may be performed by multiple machines. What is important is that the function performed is a centralized function coordinated among all the machines. Reference to steps performed at local machine 1104 should be understood to mean that the steps are performed by all p local machines.

In step 1106, the network 1102 distributes each local machine's training data portion to the local machine. Values are initialized at the local machine 1104 in step 1112. This initialization is as described above in connection with FIG. 502 of FIG. 5A. It is noted here that each of the local machines 1104 only handle a particular range (lo to hi) of indices, and these values are set as shown at 1150 in the pseudo code of FIG. 11 B. As illustrated in FIG. 12, machine 1202 handles indices from $lo_1$ to $hi_1$, and machine 1204 handles indices from $lo_2$ to $hi_2$. In step 1114 the local machine 1104 selects a working set $(x_i, x_j)$ based on the gradients calculated in step 1120 (for the first iteration, two training data samples are chosen randomly for the working set). It is noted here that since each machine has only a local view of the kernel matrix (as shown in FIG. 12), it cannot drive the global optimization. Thus, as represented at 1116, the local machine 1104 transmits is $n_w$ largest gradients $(G_i, G_j)$ over the network to network machine 1102. Efficient transmissions of data over the network will be described in further detail below in conjunction with FIGS. 13-15. The network machine 1102 then uses the received gradients to select the global working set in step 1108. This depends on $n_w$. In the case of a small $n_w$ (e.g., $n_w=2$) the computational cost is small compared to the network communication cost. The indices i and j of the globally optimal working set are communicated to the local machine 1104 as represented by 1122. It is noted that selection of the globally optimal working set is important for rapid convergence to the global optimum. Experimentation has shown that it is more effective to drive the optimization based on a global view of all the gradients at the network machine 1102, than letting each local machine do optimizations based on their local data and then consolidate the results.

In step 1118 the global working set is optimized as discussed above in connection with step 506 of FIG. 5. The optimization in step 1118 requires the kernel matrix elements $K(x_i,x_i)$, $K(x_j,x_i)$, $K(x_i,x_j)$ and $K(x_j,x_j)$. However, unlike the embodiment described above, in this embodiment each of the local machines 1002 and 1004 only contains a portion of the training data, and therefore the local machines do not have the required data to determine the necessary kernel matrix elements. As shown in FIG. 12, machine 1202 contains training data element $x_j$, but not element $x_i$, and machine 1204 contains data element $x_i$ but not element $x_j$. Thus, a transfer of training data elements $x_i$ and $x_j$ is required between local machines, as represented by 1122. This is also represented in FIG. 12 where it shows machine 1202 sending training data element $x_j$ and receiving training data element $x_i$, and machine 1204 sending training data element $x_i$ and receiving training data element $x_j$. While this may seem to imply a large communication overhead, simulations have shown that this overhead is not large, and it scales with log(p).

Returning now to FIG. 11A, when the required training data items are communicated to each of the local machines, then the kernel matrix elements $K(x_i,x_j)$ 1220, $K(x_j,x_i)$ 1222, $K(x_i,x_j)$ 1224 and $K(x_j,x_j)$ 1226 may be computed by the local machines in step 1118. Next, the gradients of the entire set need to be updated. Since the local machines 1202 and 1204 now contain the required training data elements, each local machine can update its set of gradient in step 1120. As described above, in accordance with the principles of the present invention, each of the local machines 1202 and 1204 only stores a subset of the kernel matrix. Thus, with respect to kernel elements $K(x_i,x_k)$ and $K(x_j,x_k)$, local machine 1202 computes these elements for $(k=lo_1 \ldots hi_1)$, as shown in FIG. 12 as columns 1228 and 1230 respectively. Local machine

1204 computes these elements for (k=lo$_2$ ... hi$_2$), as shown in FIG. 12 as columns 1232 and 1234 respectively. Upon updating of the gradients, the training data vectors x$_i$ and x$_j$ that were received by a local machine in order to perform the optimization step (1118) and gradient update step (1120) may be removed from those local machines for which such data elements are not originally assigned. This is represented in the pseudo code as 1152. For example, this removal procedure would remove data element x$_i$ from machine 1202 and data element x$_j$ from machine 1204 When the convergence test of step 1110 is satisfied, the method ends.

Once again, in accordance with the advantages of the present invention, each of the local machines only needs to compute and store a portion of the kernel matrix. Local machine 1202 computes and stores portion 1208 and local machine 1204 computes and stores portion 1210. Since the computation and storage of the kernel matrix is one of the costliest functions (in terms of computing resources), the distribution of these functions among distributed local machines provides significant processing optimizations. An advantage of the embodiment described in conjunction with FIGS. 11A, 11B and 12 is that the kernel matrix, training data, computation, and communication are spread generally evenly among the local machines.

A general modeling of calculations and communications of the embodiments described herein is provided as follows. The computationally demanding part of the algorithm is the update of the gradients. If $\alpha_j$ is changed in the optimization, then each machine has to calculate for each of its gradients $$\Delta G_i = -\Delta a_j y_i y_j K_{ij} : i=1 \ldots m \; m:n/p \quad (4)$$

The time T$_c$ required for calculating the updates for one iteration can be approximated by:

$$T_c = n_w * d * m/c = n_w * d * n/(p*c) \; c: \text{calculation speed[op/sec]} \quad (5)$$

This assumes that the kernel computation dominates all other computations and requires d operations, a reasonable approximation if, for example, for RBF (Radial Basis Function) or polynomial kernels a dot product of two vectors is computed and d is large.

The communication requirements for one iteration are: n$_w$ elements from each machine to determine the next working set and up to n$_t$=n$_w$*d elements to every machine for the gradient updates.

The time t$_t$ it takes to communicate n$_t$ elements between two processors is:

$$t_1 = t_f + n_1/b \; t_f: \text{latency to initiate communication [sec]} \quad (6)$$

b: bandwidth[byte/sec]

The total communication time T$_t$, that includes collecting the gradients and distributing the data is then (assuming broadcast for distributing the data for gradient updates):

$$T_1 = (n_w/b + t_1) *_2 \log(p) + n_w * d/b + t_1 \quad (7)$$

This indicates a favorable scaling of the communication load with the number of processors of O(log(p)). Without broadcast capabilities the second and third terms of equation (7) get multiplied with log(p), but this does not change the order of the scaling. The effect of caching the kernel values can be modeled by replacing equation (5) with:

$$T_c = \gamma * (n_w * n/(p*c)) + (1-\gamma) * (n_w * d * n/(p*c)) \quad (8)$$

Here, $\gamma$ is the average cache hit rate, i.e. the fraction of requests for a kernel value that can be satisfied from the cache.

These equations do not predict precisely the times for calculation and communication because some constant factors are neglected that can only be determined when the actual kernel function is known. But they indicate the scaling of the terms that usually dominate the time budget. From a parallelization point of view it is significant that the communication time T$_t$ is O(log(p)) and the calculation time T$_c$ is O(1/p), indicating that the principles of the invention are useful for a large number of processors. Moreover, the memory requirement also scales with O(1/p), resulting in higher cache hit rates $\gamma$, which leads often to superlinear acceleration.

A limiting factor is the constant communication overhead between processors, t$_f$, which may be, for example, 0.05-0.1 ms. When computation times become small, the constant term, log(p)*t$_f$ from equation (7) starts to dominate. That means, for a very large number of machines the computation of each of them becomes comparable in time to the communication latency, at which point a further increase in the number of machines does not improve the speed any further. Equations (5) through (8) provide reasonable estimates if n$_w$ is small and the calculation for the optimization can be neglected. Typically n$_w$<100 may be used, where this simplification is justified.

Figure 13:
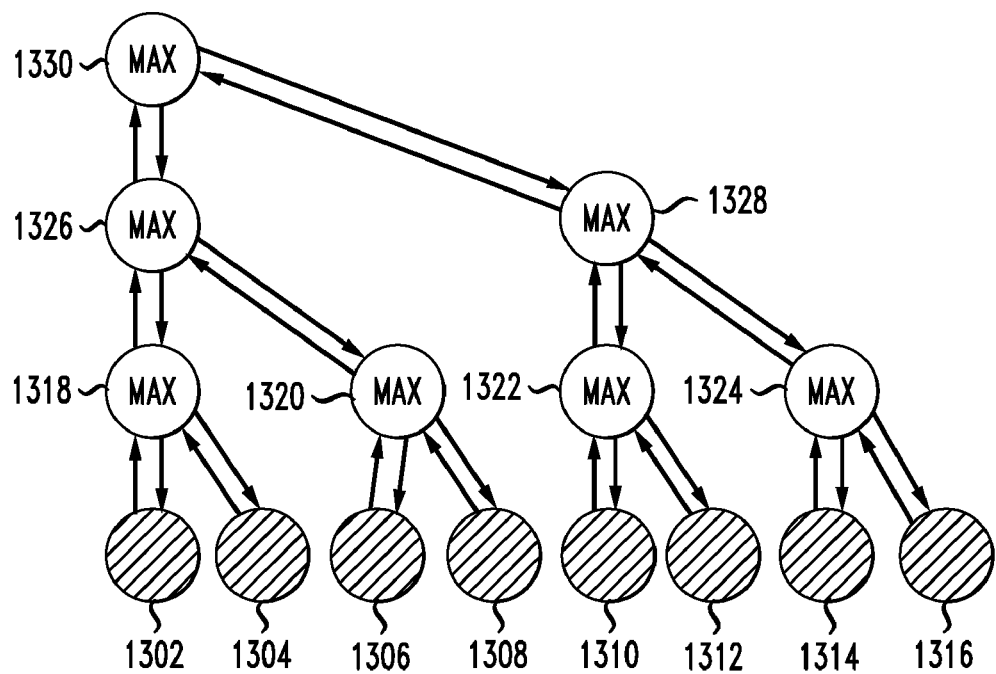
FIGS. 13-15 illustrate logical network architectures for communicating data in accordance with various embodiments of the invention.

One skilled in the art will recognize that there are various possibilities for implementing the required network communications described above. More particularly, as represented at 916 (FIG. 9) and 1116 (FIG. 11) the local machines transmit their n$_w$ largest gradients over the network and the global working set is selected in steps 908 (FIG. 9) and 1108 (FIG. 11). In a straightforward embodiment, the largest gradients could be sent to a single network machine for determination of the maximum gradients in order to determine the global working set. However, more efficient network communications may be implemented in various embodiments in order to further optimize processing. FIG. 13 shows one such embodiment, in which a plurality of network nodes are used to select maximum gradients. Each of the local machines are represented as shaded circles 1302 through 1316. In an embodiment utilizing the network architecture of FIG. 13, each of the local machines 1302-1306 transmits its largest gradients to a next higher level network node. Local machines 1302 and 1304 transmit their largest gradients to network node 1318, local machines 1306 and 1308 transmit their largest gradients to network node 1320, local machines 1310 and 1312 transmit their largest gradients to network node 1322, and local machines 1314 and 1316 transmit their largest gradients to network node 1324. In turn, each of the network nodes 1318, 1320, 1322 and 1324 determine the n$_w$ maximum gradients of the received gradients, and then transmit the determined largest gradients to the next higher level network machines. Network machines 1318 and 1320 transmit their determined largest gradients to network machine 1326, and network machines 1322 and 1324 transmit their determined largest gradients to network machine 1328. Finally, network machine 1326 and 1328 determine the maximum gradients of the received gradients and transmit the determined largest gradients to top level network machine 1330. Network machine 1330 then determines the n$_w$ largest gradients of its received gradients. The indices of the n$_w$ vectors in the working set (plus the n$_w$ data vectors of the working set if the algorithm of FIGS. 11A and 11B are used) are then broadcast down the network machines to the local machines. More particularly, network machine 1330 transmits the indices to network machines 1326 and 1328. Network machine 1326 transmits the indices to network machines 1318 and 1320. Network machine 1328 transmits the indices to network machines 1322 and 1324. Network machine 1318 transmits the indices to local machines 1302 and 1304. Network machine 1320 transmits the indices to local machines 1306 and 1308. Network machine 1322 transmits the indices to local machines 1310 and 1312. Network machine 1324 transmits the indices to local machines 1314 and 1316. Thus, in this embodiment, the gradients having the largest value are determined using a tree structure of network machines along with a hierarchal broadcast of the result from a top level network machine to the local machines via intermediate network machines.

Figure 14:
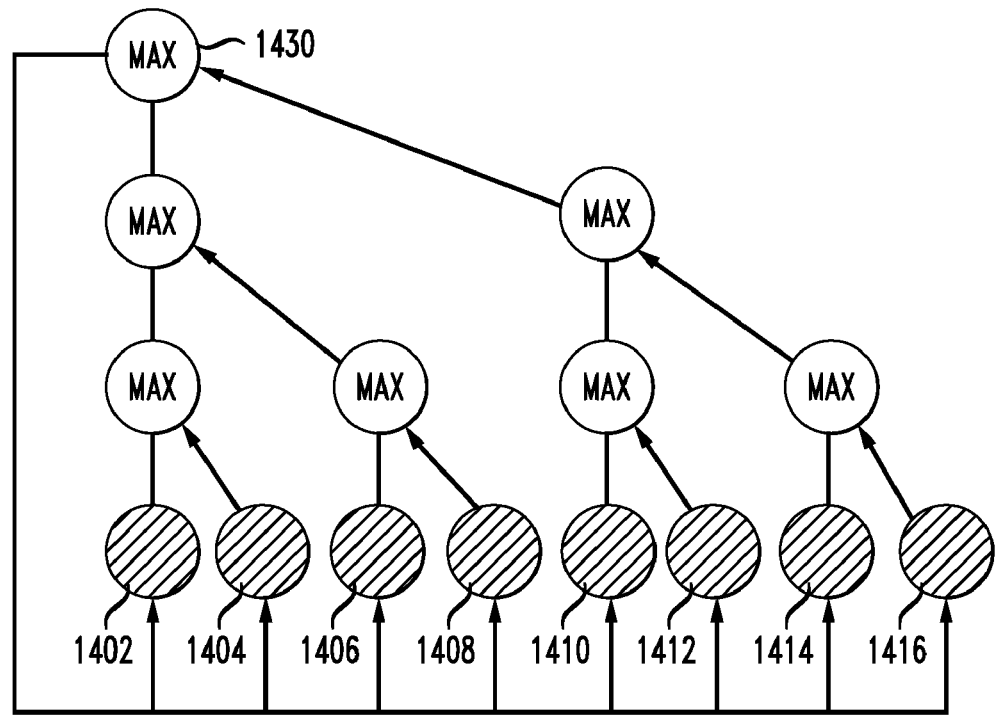

FIG. 14 shows another embodiment in which a plurality of network nodes are used to select maximum gradients. Again, each of the local machines are represented as shaded circles 1402-1416. The embodiment of FIG. 14 is the same as FIG. 13 with respect to determining the maximum gradients. However, instead of broadcasting the indices to the local machines in a hierarchical manner back through the intermediate network machines (as is done in FIG. 13), in FIG. 14 the top level network machine 1430 transmits the indices directly to each of the local machines 1402-1416.

Figure 15:
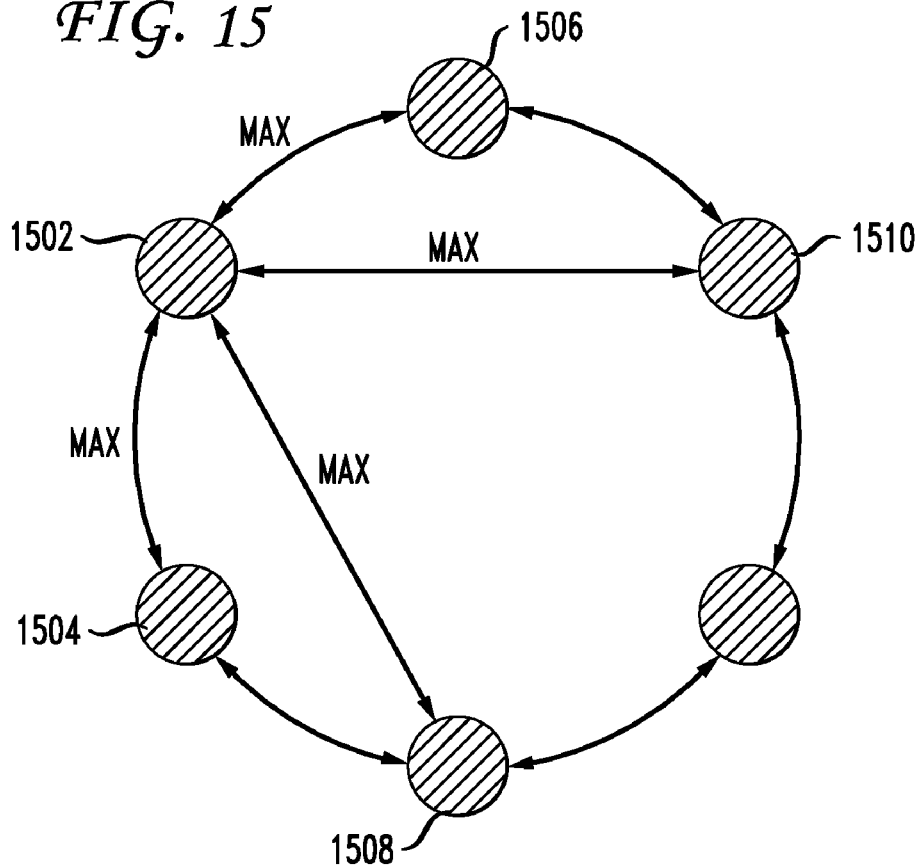

FIG. 15 shows another embodiment for network communication. In this embodiment each machine (represented by a shaded node in the graph) sends its working set to its neighbor nodes and then each node calculates the best $n_w$ samples as the new working set using the two working sets received from its neighbors. Each machine then sends this new working set to its second nearest neighbor nodes and then again each node calculates a new working set using the two received working sets. This process repeats with the distances between machines that exchange data increasing by 1 during each successive iteration. For example, consider machine 1502. During a first iteration, machine 1502 will send its working set to machines 1504 and 1506, and will receive the working sets from machines 1504 and 1506. Machine 1502 will then calculate the best $n_w$ samples as the new working set using the working set received from machine 1504 and the working set received from machine 1506. During a second iteration, machine 1502 will send its most recently calculated working set to machines 1508 and 1510, and will receive the most recently calculated working sets from machines 1508 and 1510. Machine 1502 will then calculate the best $n_w$ samples as the new working set using the working set received from machine 1508 and the working set received from machine 1510. This processing will continue, with the distance between machines that exchange data increasing by one during each successive iteration.

One skilled in the art will recognize that various flowcharts and block diagrams described herein represent functional steps and functional elements of various embodiments of the invention. Actual hardware embodiments may vary and it will be readily apparent to one skilled in the art how to implement the various embodiments of the invention given the description herein. For example, the functions described herein may be performed by computers containing processors which are executing computer program code which defines the functionality described herein.

Figure 16:
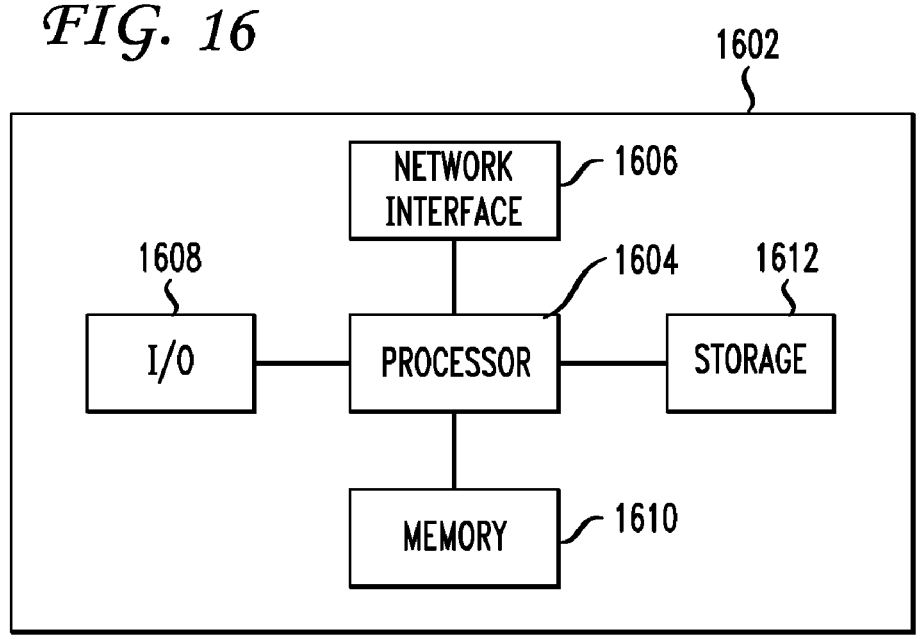
FIG. 16 shows a high level block diagram of a computer which may be used to implement processing nodes in accordance with an embodiment of the invention.

Such computers are well known in the art, and may be implemented, for example, using well known computer processors, memory units, storage devices, computer software, and other components. A high level block diagram of such a computer is shown in FIG. 16. Computer 1602 contains a processor 1604 which controls the overall operation of computer 1602 by executing computer program instructions which define such operation. The computer program instructions may be stored in a storage device 1612 (e.g., magnetic disk) and loaded into memory 1610 when execution of the computer program instructions is desired. Thus, the operation of computer 1602 is defined by computer program instructions stored in memory 1610 and/or storage 1612 and the computer 1602 will be controlled by processor 1604 executing the computer program instructions. Computer 1602 also includes one or more network interfaces 1606 for communicating with other devices via a network. Computer 1602 also includes input/output 1608 which represents devices which allow for user interaction with the computer 1602 (e.g., display, keyboard, mouse, speakers, buttons, etc.). One skilled in the art will recognize that an implementation of an actual computer will contain other components as well, and that FIG. 16 is a high level representation of some of the components of such a computer for illustrative purposes. One skilled in the art will also recognize that the functionality described herein may be implemented using hardware, software, and various combinations of hardware and software.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for training a support vector machine, comprising the steps of:
   a) selecting, via a processor of a first processing node, a local working set of training data based on local training data stored in a memory of the first processing node;
   b) transmitting, via a network interface of the first processing node, certain gradients to a second processing node, the certain gradients selected from gradients of the working set of training data;
   c) receiving at the network interface of the first processing node an identification of a global working set of training data;
   d) executing, via the processor of the first processing node, a quadratic function stored in a storage device of the first processing node to optimize said global working set of training data;
   e) updating gradients of the training data stored in the memory of the first processing node; and
   f) repeating said steps a) through e) until a convergence condition is met.

2. The method of claim 1 wherein said local working set of training data comprises a local subset of gradients.

3. The method of claim 1 wherein said local working set of training data comprises a maximum value of a function determining maximum values of a local subset of gradients.

4. The method of claim 1 wherein said certain gradients of said local working set of training data are gradients having a maximum value.

5. The method of claim 1 wherein the local training data stored in the memory of the first processing node comprises an entire set of training data.

6. The method of claim 1 wherein the local training data stored in the memory of the first processing node comprises a portion of an entire set of training data.

7. The method of claim 6 wherein said step of receiving further comprises the step of receiving at least a portion of the global working set of training data.

8. The method of claim 1 wherein said step of updating further comprises the step of generating a portion of a kernel matrix.

9. A method for training a support vector machine, comprising the steps of:
   a) selecting, at each of a plurality of processing nodes, via a processor of each of the processing nodes, a local working set of training data based on local training data stored in a memory of each of the processing nodes;
   b) generating, via a processor of a network machine, a global working set of training data using certain gradients selected from gradients of each of the working sets of training data;
   c) executing, at each of said plurality of processing nodes, via the processor of each of the processing nodes, a quadratic function stored in a storage device of each of the processing nodes to optimize said global working set of training data;
   d) updating, at each of said plurality of processing nodes, gradients of the training data stored in the memory of each of the processing nodes; and
   e) repeating steps a) through d) until a convergence condition is met.

10. The method of claim 9 wherein said working set of training local data comprises a local subset of gradients.

11. The method of claim 9 wherein said local working set of training data comprises a maximum value of a function of a local subset of gradients.

12. The method of claim 9 wherein said certain gradients of said local working set of training data are gradients having a maximum value.

13. The method of claim 12 further comprising the steps of:
   determining said gradients having a maximum value using a tree structure of network nodes; and
   transmitting, at each of the plurality of processing nodes via a network interface of each of the processing nodes, said gradients having a maximum value using hierarchal broadcast.

14. The method of claim 9 wherein the local training data stored in the memory of each of the processing nodes comprises an entire set of training data.

15. The method of claim 9 wherein the local training data stored in the memory of each of the processing nodes comprises a portion of an entire set of training data.

16. The method of claim 15 further comprising the step of receiving, at each of said plurality of processing nodes, at least a portion of the global working set of training data.

17. The method of claim 9 wherein said step of updating comprises the step of generating, at each of said plurality of processing nodes, a portion of a kernel matrix.

18. The method of claim 1, further comprising the step of generating, via a processor of a network machine, the global working set of training data using the certain gradients.

* * * * *